United States Patent [19]
Hamabe

[11] Patent Number: 6,026,081
[45] Date of Patent: Feb. 15, 2000

[54] METHOD OF CONTROLLING POWER ON FORWARD LINK IN A CELLULAR

[75] Inventor: Kojiro Hamabe, Tokyo, Japan

[73] Assignee: NEC Corporation, Tokyo, Japan

[21] Appl. No.: 08/889,008

[22] Filed: Jul. 7, 1997

[30] Foreign Application Priority Data

Jul. 5, 1996 [JP] Japan ................................. 8-176754

[51] Int. Cl.⁷ .............................. H04B 7/216; H04B 1/00
[52] U.S. Cl. .............................. 370/335; 370/342; 455/69
[58] Field of Search ................................. 370/342, 335, 370/332, 209, 311; 455/69, 63, 522, 422, 70, 560, 436; 375/200, 295, 267

[56] References Cited

U.S. PATENT DOCUMENTS

| 5,345,598 | 9/1994 | Dent | 455/69 |
|---|---|---|---|
| 5,559,790 | 9/1996 | Yano et al. | 370/342 |

FOREIGN PATENT DOCUMENTS

| 7-38496 | 2/1995 | Japan . |
|---|---|---|
| 8-18503 | 1/1996 | Japan . |
| 8503833 | 4/1996 | Japan . |
| 8116306 | 5/1996 | Japan . |
| 8256102 | 10/1996 | Japan . |
| 9525365 | 9/1995 | WIPO . |

*Primary Examiner*—Alpus H. Hsu
*Assistant Examiner*—Afsar Qureshi
*Attorney, Agent, or Firm*—Sughrue, Mion, Zinn, MacPeak & Seas, PLLC

[57] ABSTRACT

A method of controlling transmission power of a plurality of base stations associated with a mobile unit in a CDMA (code division multiple access) cellular system, is disclosed. The mobile unit communicates with one base station among the plurality of base stations. According to the present invention, power of each of pilot signals respectively transmitted from the plurality of base stations is measured at the mobile unit. Following this, information about a measured power value of each of the pilot signals is transmitted to the one base station. Thereafter, a first power control coefficient is determined at the one base station. The coefficient is a ratio of total pilot power values of the plurality of base stations, other than the main base station, to a pilot power value of the one base station. Subsequently, the transmission power of each of the plurality of base stations using the first power control coefficient is controlled.

14 Claims, 12 Drawing Sheets

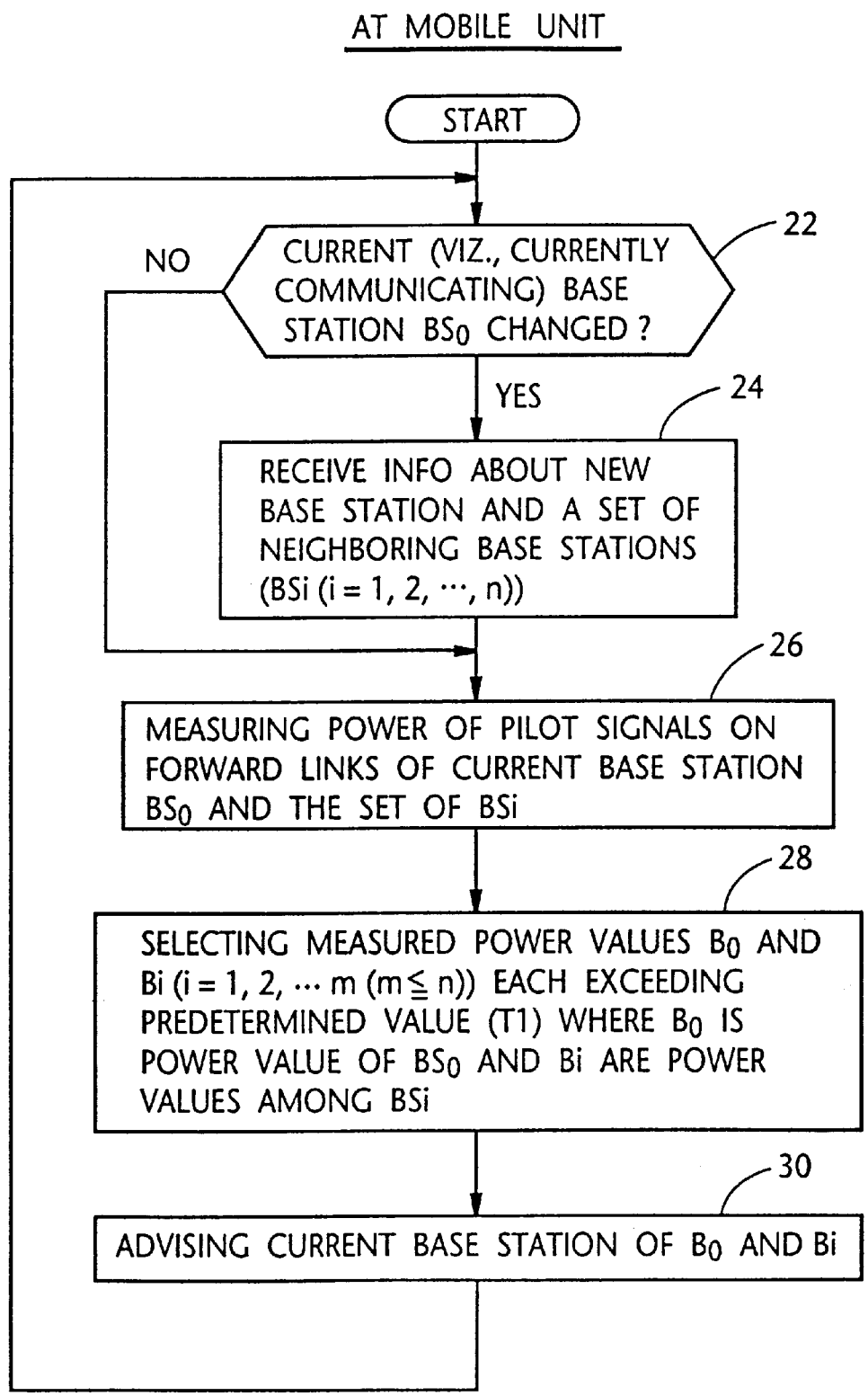

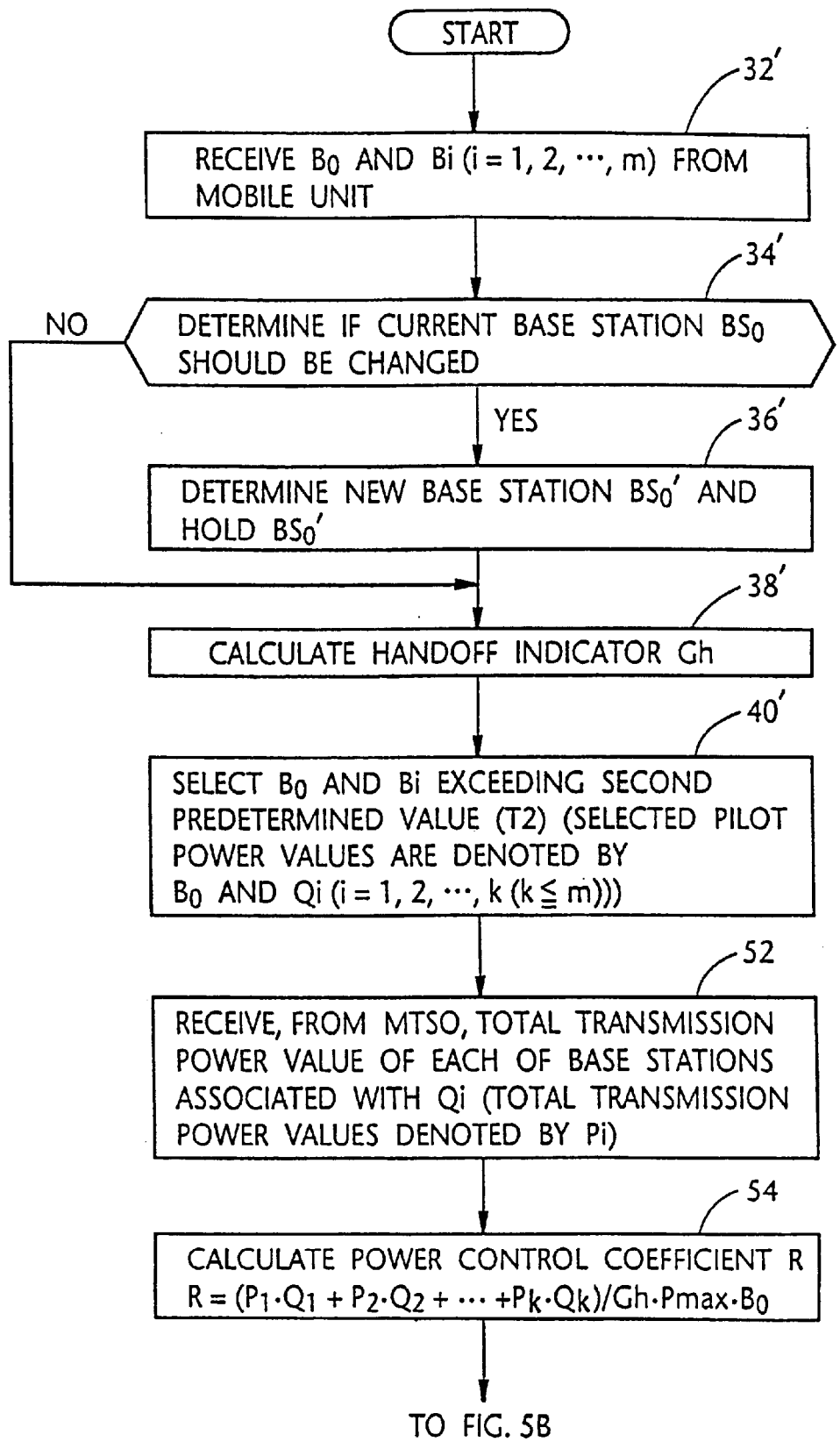
FIG. 5A — AT CURRENT BASE STATION

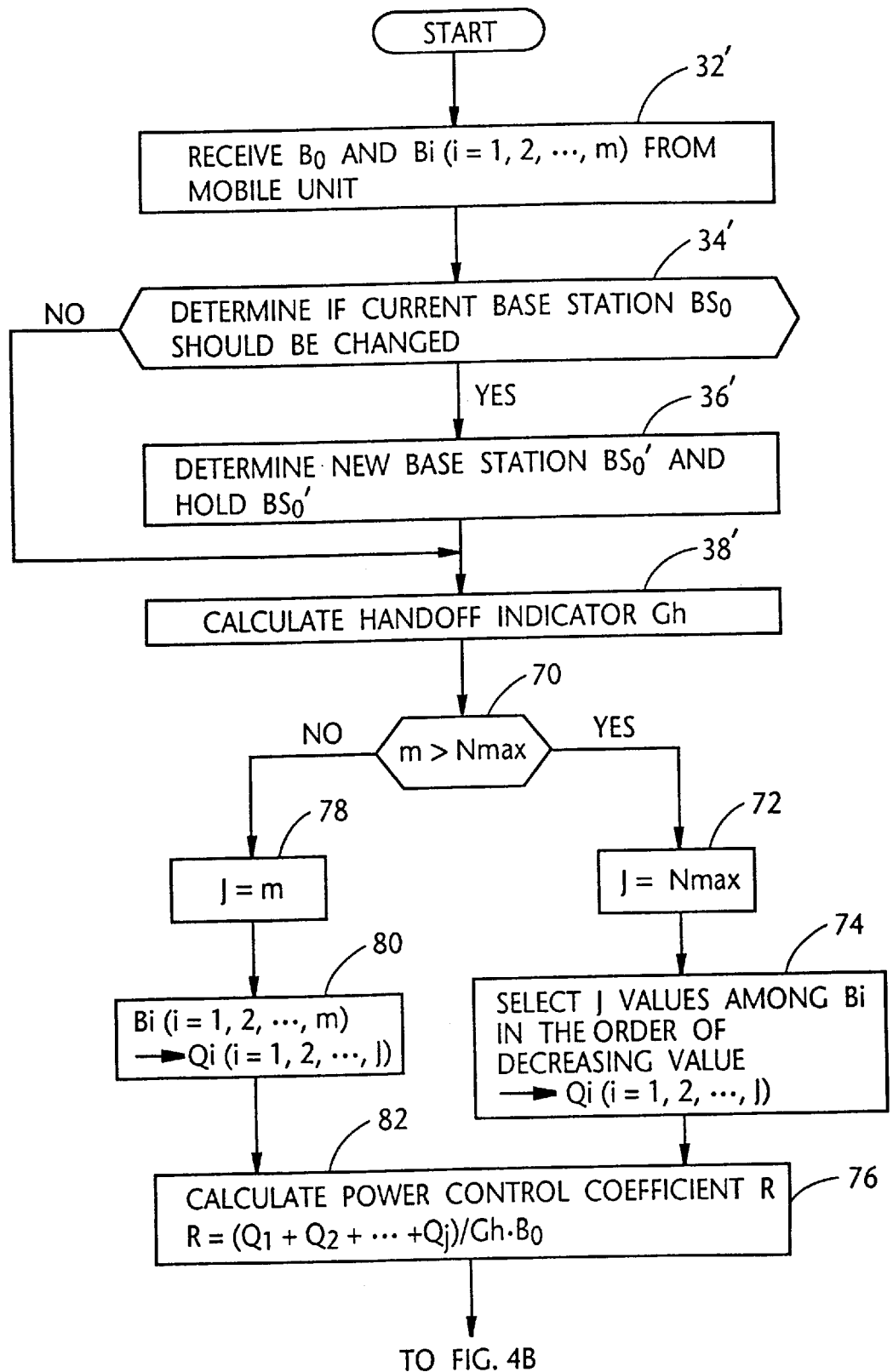

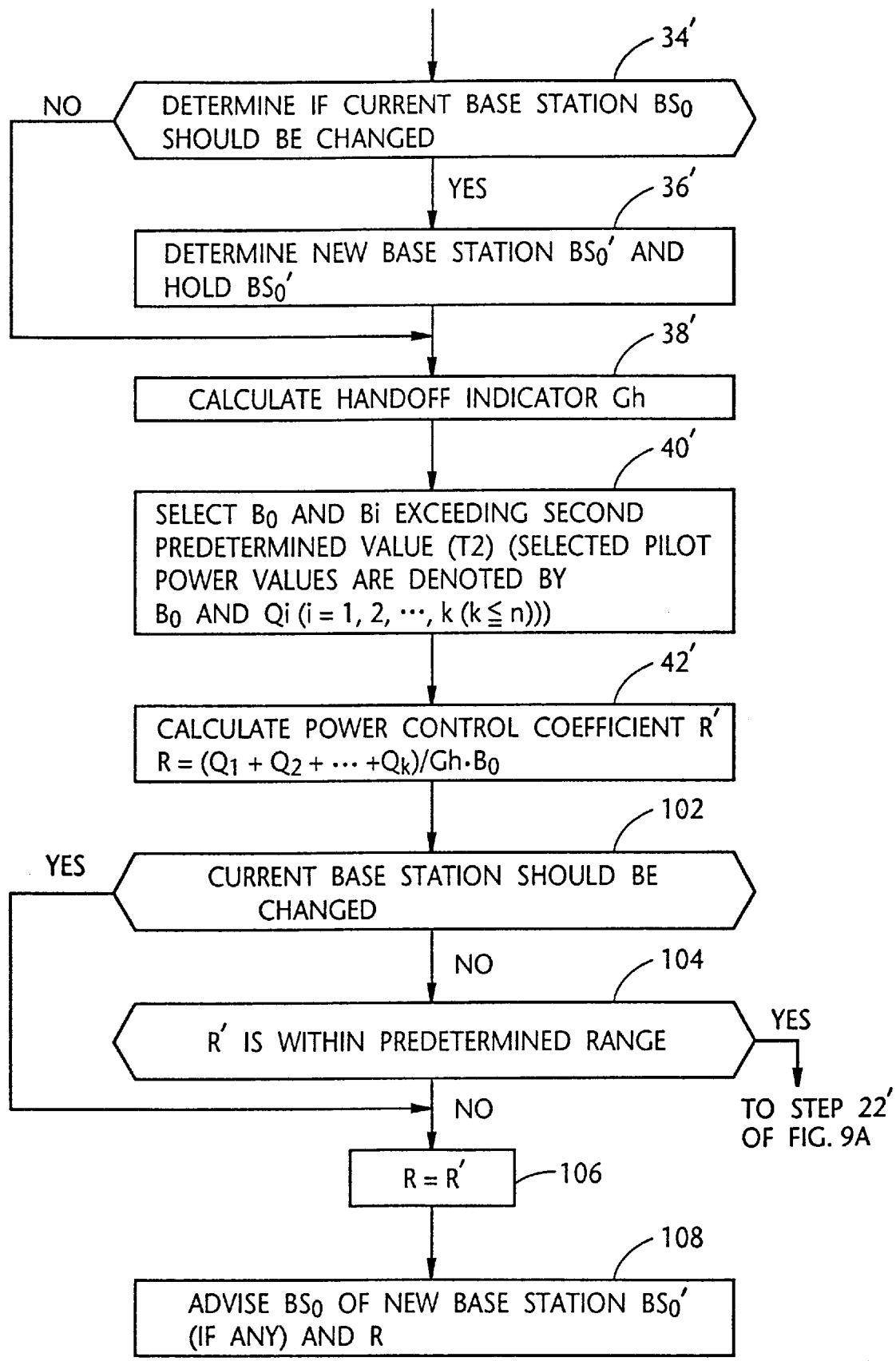

METHOD OF CONTROLLING POWER ON FORWARD LINK IN A CELLULAR

BACKGROUND OF THE INVENTION

1. Field of the Invention

The present invention relates generally to techniques in transmission power control of base stations in a CDMA (code division multiple access) cellular system using spread spectrum techniques. More specifically, the present invention relates to a power control method on forward links (viz., base station to mobile unit links) in a CDMA cellular system in order to increase capacity of the overall system.

2. Description of the Related Art

As is well known in the art, in a CDMA system, all users transmit simultaneously and at the same frequency. The transmitted signals occupy the entire system bandwidth, and code sequences, which are orthogonal, are used to separate one user from another. That is, each user is assigned a unique code sequence. The use of the same frequency in the overall system indicates that no "handoff" from one frequency to another is needed as in FDMA (frequency division multiple access) and TDMA (time division multiple access) systems. This is called a soft handoff that is disclosed in U.S. Pat. No. 5,101,501 by way of example.

In a CDMA system, there is no distinct limit on the number of users. The system performance for all users degrades gradually as the number of active users increases. More specifically, mobile units in the CDMA system transmit independently (viz., asynchronously) from each other. This means that their signals arrive randomly at the base station and therefore, the crosscorrelation between these randomly arrived signals is not zero and thus causes interference.

The major difficulty with CDMA is a so-called "near-far effect", which occurs when a weak signal received at the base station from a distant mobile unit is overpowered by a strong signal from a nearby interferer. To reduce the near-far effect, power control on reverse links (viz., mobile unit to base station links) is necessary.

Additionally, the system capacity is expanded by power control on the forward links (viz., base station to mobile unit links). One example of such power control on the forward link is disclosed in Japanese Laid-open Patent Application No. 7-38496. According to this conventional technique, each of the mobile units in a given cell receives a pilot signal from the cell's base station, measures a signal-to-noise (S/N) ratio using the pilot signal received, and then informs the base station of the measurement results. The base station responds to the measurement results and controls the transmission power on the forward link of each mobile unit. Thus, the S/N ratios at the mobile units within the cell are improved and approach a predetermined level (viz., roughly equalized). As a result, a low level of interference is achieved at each mobile unit.

This conventional technique, however, has suffered from a drawback. That is, when a S/N ratio at a given mobile unit is lowered due to increase in the number of the active users in the cell, the base station is responsive to the reduced S/N ratio and raises the power on the forward link to the given mobile unit. This in turn undesirably lowers the S/N ratio at each of other mobile units, with the result that the S/N ratio of the first base station again is lowered. This cycle is repeated and eventually the power of each forward link of many mobile units undesirably is raised to the maximum value.

Further, it takes a relatively long time until the lowering of interference is carried out after the measurement of the S/N ratio. Therefore, during the long feedback time, the S/N ratio measured has undesirably changed. In such a case, a precise control is no longer expected.

SUMMARY OF THE INVENTION

It is therefore an object of the present invention to provide a method of achieving a low level of interference, especially in the vicinity of a cell boundary, even if the number of active users increases, whereby it is possible to keep constant the system performance for all users.

One aspect of the present invention resides in a method of controlling transmission power of a plurality of base stations ass with a mobile unit in a CDMA (code division multiple access) cellular system, the mobile unit communicating with one base station among the plurality of base stations, the method comprising the steps of (a) measuring, at the mobile unit power of each of pilot signals respectively transmitted from the plurality of base stations; (b) advising the one base station of information about a measured power value of each of the pilot signals; (c) determining, at the one base station, a first power control coefficient which is a ratio of total pilot power values of the plurality of base stations, other than the main base station, to a pilot power value of the one base station; and (d) controlling the transmission power of each of the plurality of base stations using the first power control coefficient

BRIEF DESCRIPTION OF THE DRAWIINGS

The features and advantages of the present invention will become more clearly appreciated from the following description taken in conjunction with the accompanying drawings in which like elements are denoted by like reference numerals and in which.

Figure 5B:
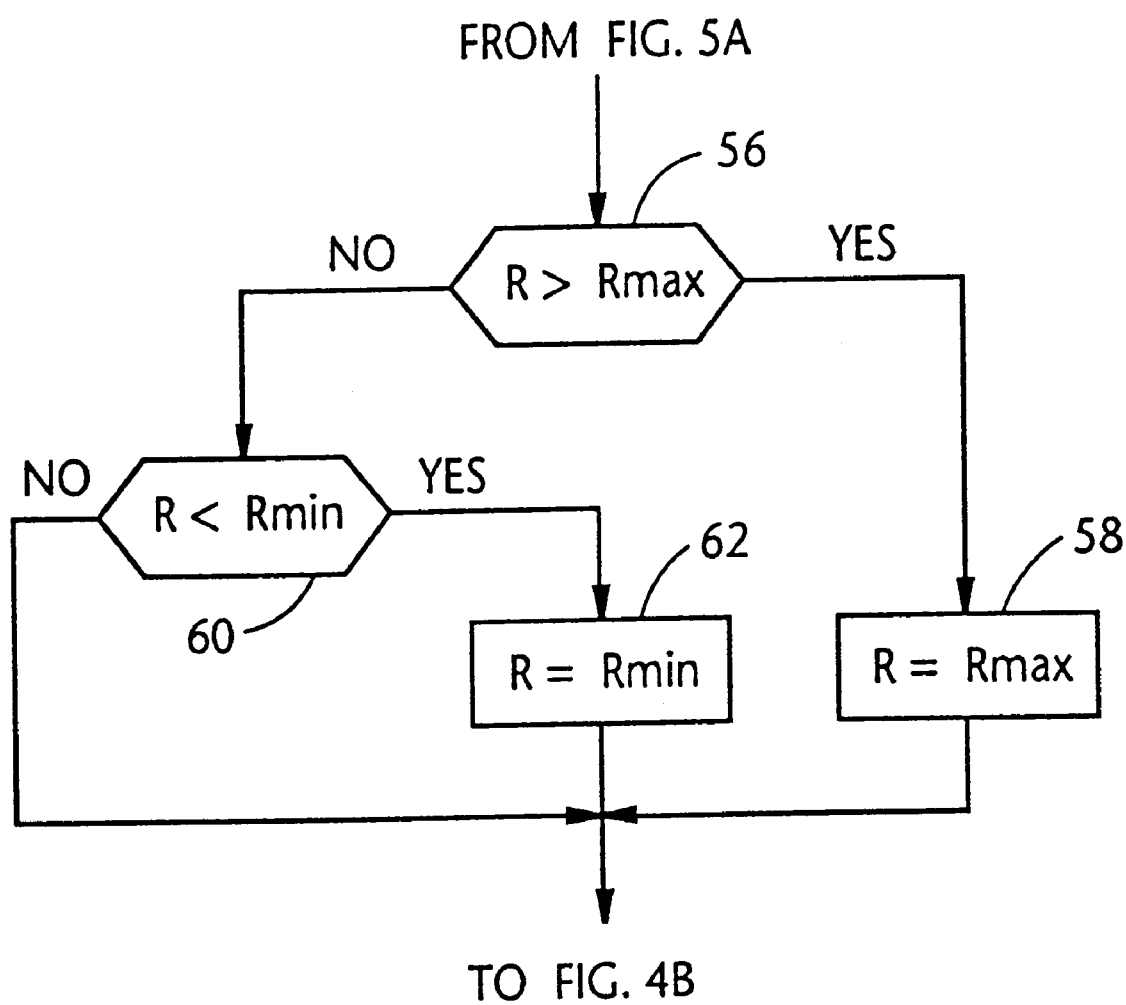
Figure 7A:
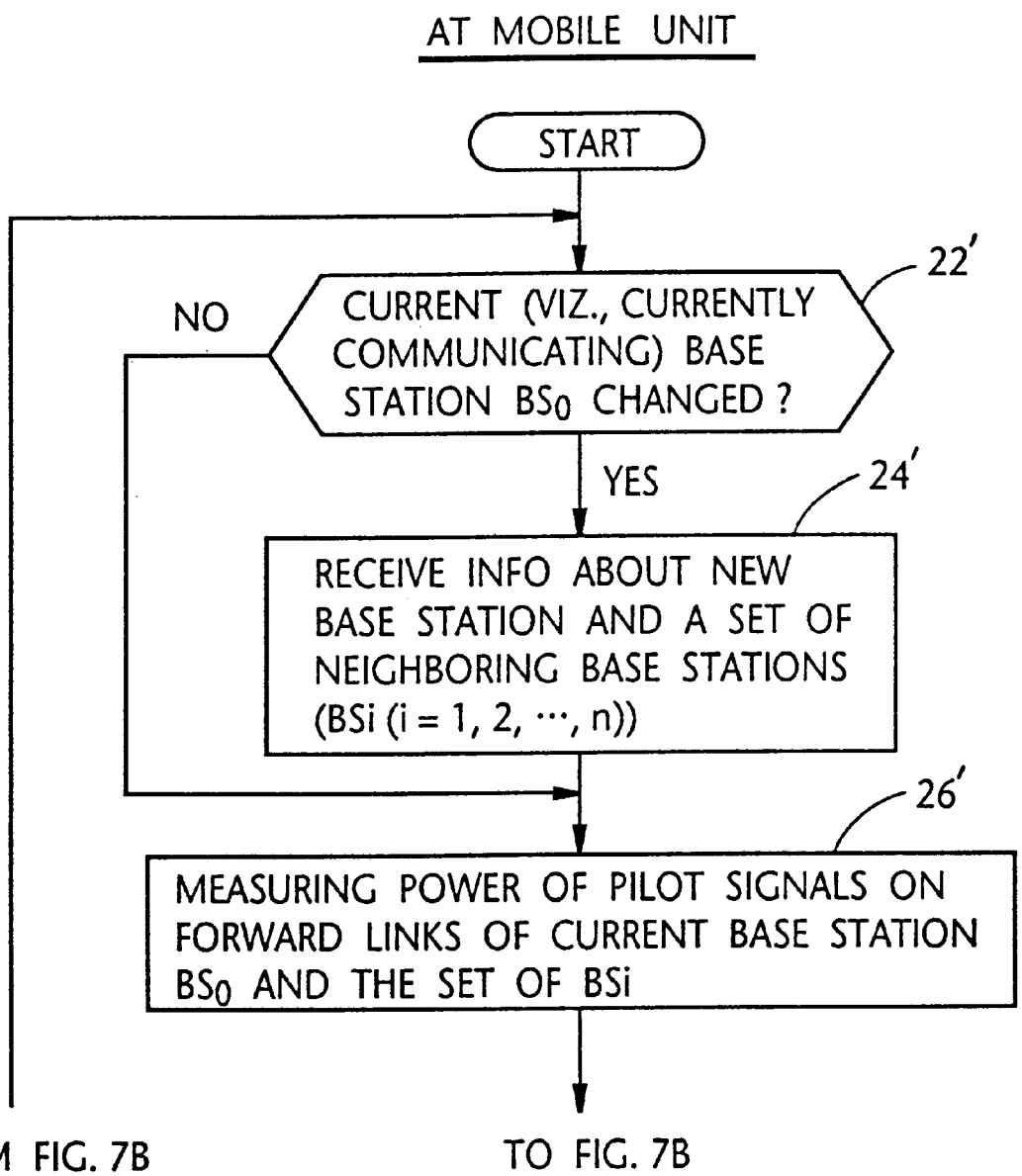
Figure 7B:
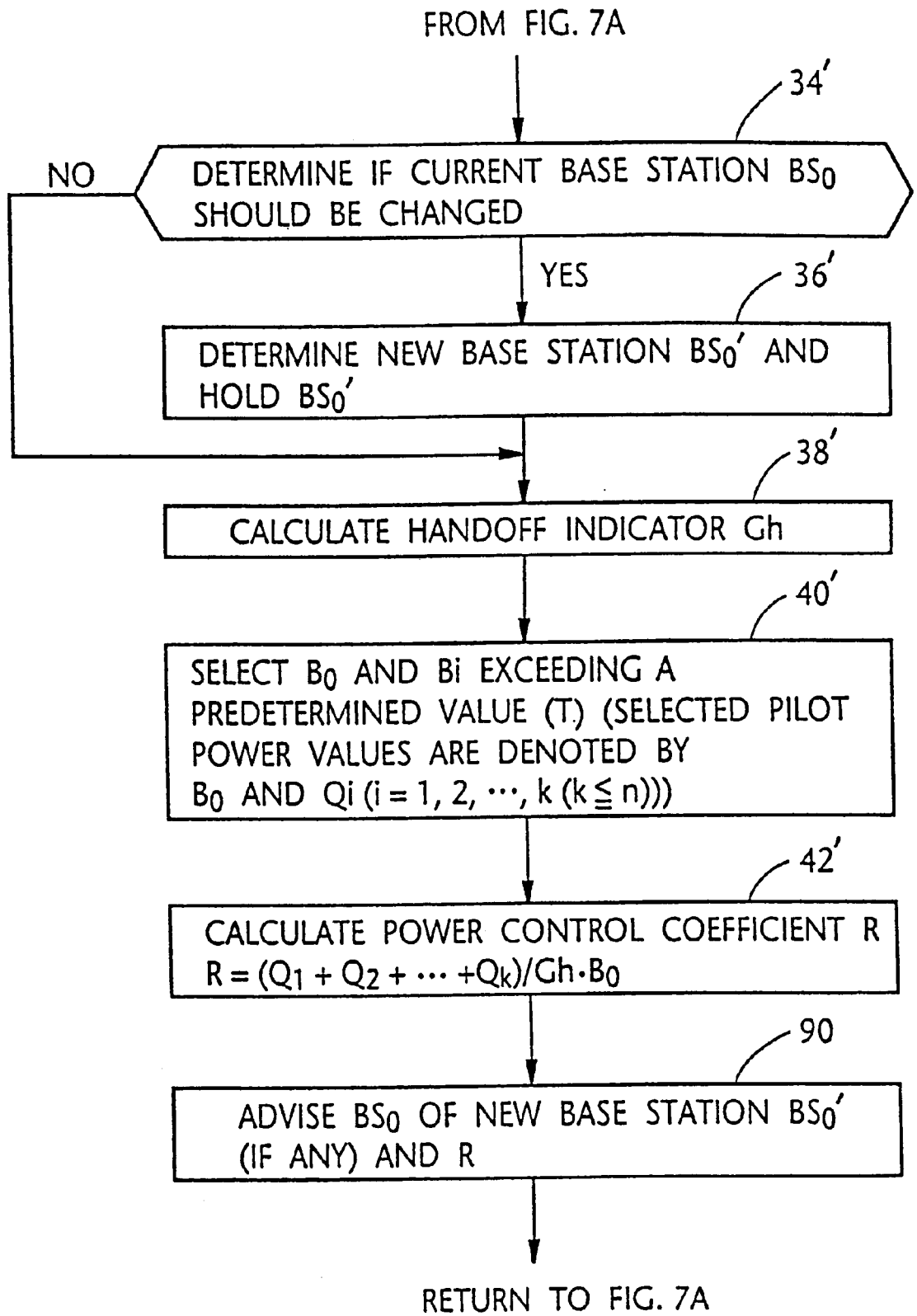
Figure 8:
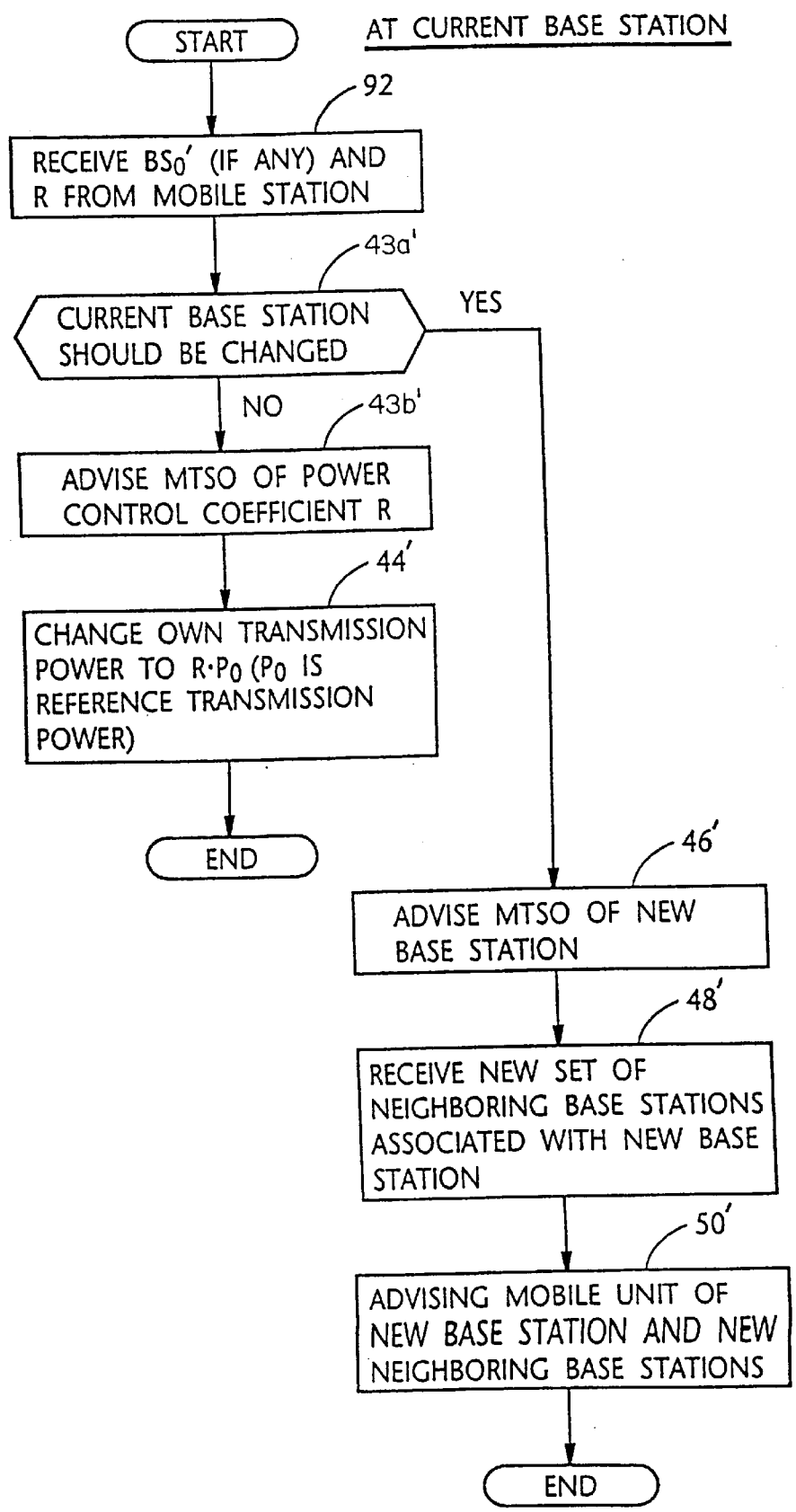
Figure 9A:
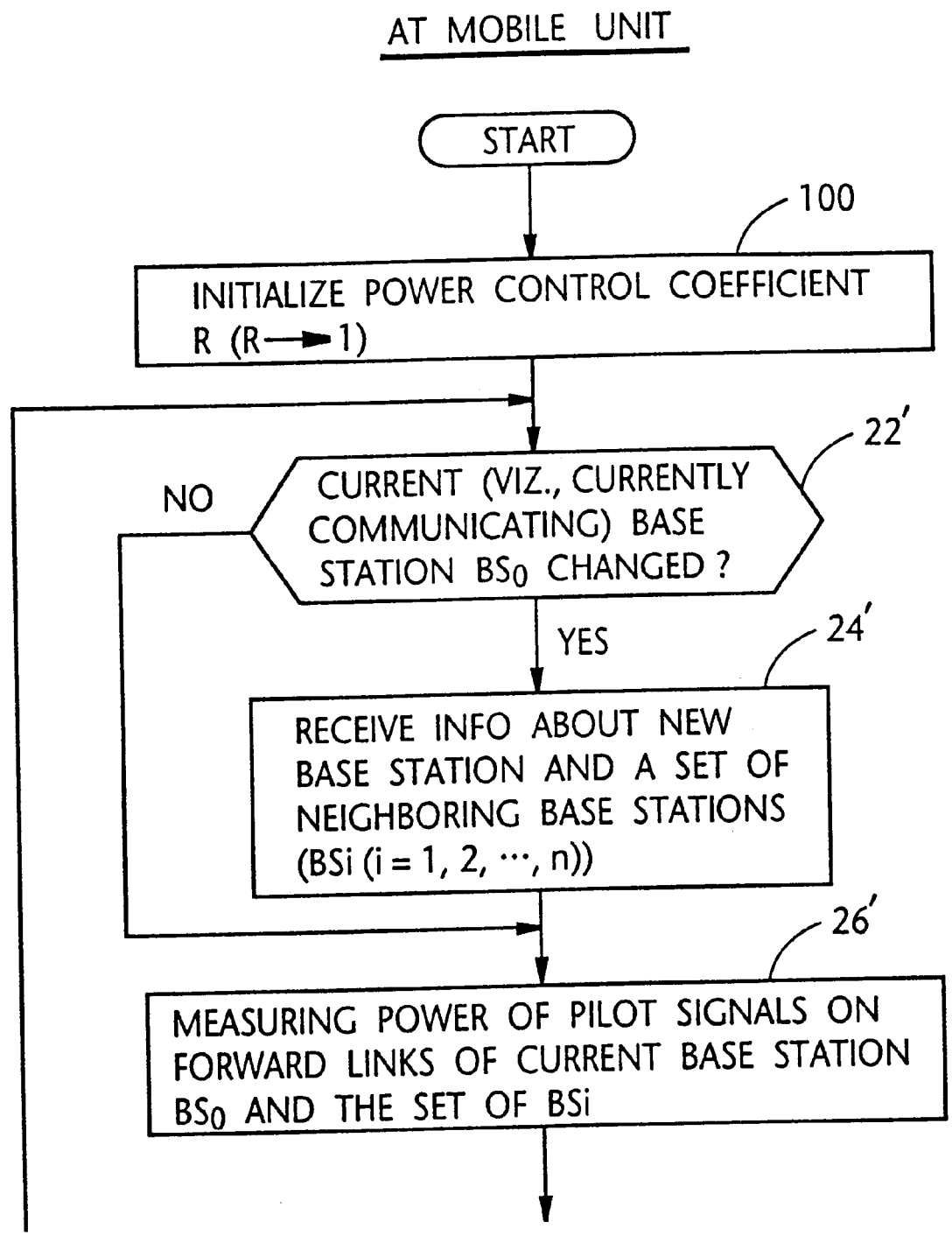

FIGS. 3. 4A and 4B are each flow chart which shows steps which characterize a first embodiment of the present invention;

FIGS. 5A and 5B are each flow chart which shows steps which characterize a second embodiment of the present invention;

FIG. 6 is a flow chart which shows steps which characterize a third embodiment of the present invention;

FIGS. 7A, 7B and 8 are each flow chart which shows steps which characterize a fourth embodiment of the present invention; and FIGS. 9A and 9B are each flow chart which shows steps which characterize a fifth embodiment of the present invention.

DETAILED DESCRIPTION OF THE PREFERRED EMBODIMENTS

Figure 1:
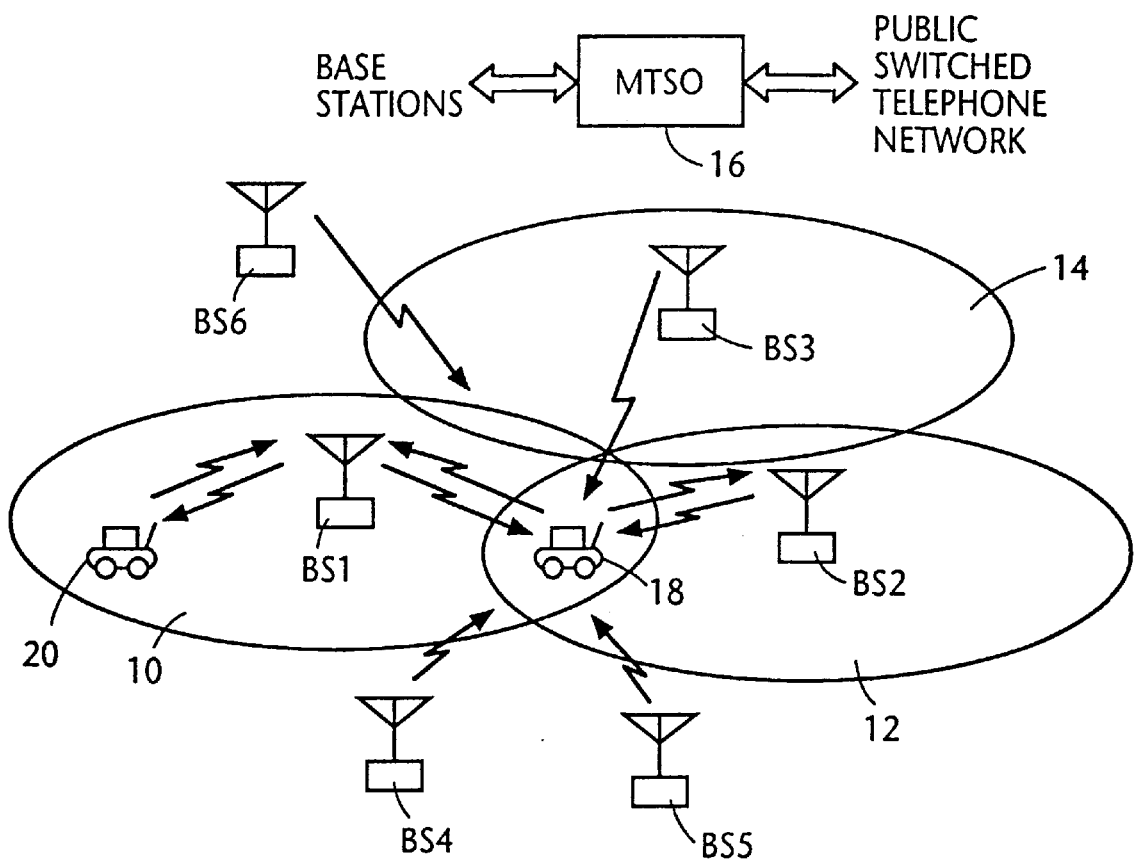
FIG. 1 is a sketch schematically showing a plurality of cells, base stations, etc. provided in a CDMA cellular system.

Referring to FIG. 1, there are shown only three cells 10, 12, and 14 which respectively include base stations BS1, BS2, and BS3. Further, as shown, another three base stations BS4–BS6 are respectively assigned to the other three cells (not shown). As is well known in the art, all the base stations in the system, including BS1–BS6, are coupled to a MTSO (mobile telephone switching office) 16, which supervises the overall operation of the system and which is in turn coupled to a public switched telephone network. Still further, two mobile units 18 and 20 are shown in FIG. 1. The mobile unit 18 is located in the vicinity of the boundary between the cells 10 and 12 and simultaneously communicates with two base stations BS1 and BS2 in order to attain the above mentioned soft handoff. However, it is to be noted that the mobile unit 18 in fact establishes a speech channel with either BS1 or BS2. It is assumed that the other mobile unit 20 is not located in the vicinity of a cell boundary and thus keeps communication only with the base station BS1.

The present invention is not directly concerned with a handoff operation but directed to effectively achieve a low level of interference in the vicinity of a cell boundary. Therefore, the system capacity can markedly be increased (viz., the number of active users can be increased without inducing degradation of signal quality).

Each of the base stations in the system constantly transmits a pilot signal the transmission power of which may vary depending on the cell size. However, in the instant disclosure, it is assumed that each base station radiates the corresponding pilot signal with a predetermined (constant) power for the sake of simplifying the description. Each pilot signal is assigned a unique code and thus, it is possible for the mobile unit to discriminate which base station generates the pilot signal.

On the other hand, each mobile unit is provided with a device for measuring the strength of each of the pilot signals arriving at the mobile unit. More specifically, the mobile unit selectively acquires a predetermined number of pilot signals using codes which are applied thereto from a currently communicating base station.

Figure 2:
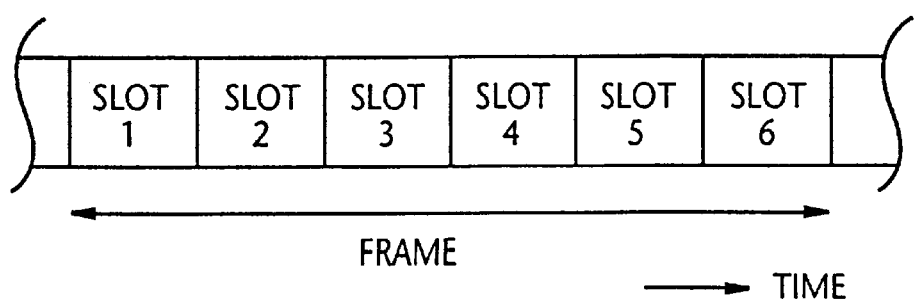
FIG. 2 is a time slot format of one frame for acquiring pilot signal power on forward links of base stations.

FIG. 2 is a diagram showing a pilot signal acquiring (or measuring) frame which consists of six time slots 1–6 in this instance. Each mobile unit acquires one pilot signal during one time slot and thus, is able to cyclically receive a total of six different pilot signals on a frame-by-frame basis in this particular case. The mobile unit typically measures the power (viz., signal strength) of one pilot signal during one time slot. If more than six pilot signals should be received at the mobile unit, the frame length can be expanded to meet the requirement. The instantaneous power of the pilot signal typically varies drastically and thus, it is a current practice to average the power over a sufficiently long time. Throughout the instant disclosure, the power of a pilot signal means an average value.

It is assumed that a mobile unit has already established a speech channel with a given base station (sometimes referred to as a current base station). In this case, the mobile unit receives, from the current base station, information indicating a set of neighboring base stations. Based on this information, the mobile unit measures the power of each of the pilot signals transmitted from the neighboring base stations in addition to the power of the pilot signal from the current base station.

A first embodiment of the present invention will be described with reference to FIGS. 3, 4A and 4B.

In FIG. 3, at step 22, the mobile unit checks to determine if the current base station should be changed (viz., handoff). The instruction of changing the current base station (denoted by $BS_0$) is advised from the current base station itself. If the current base station should be changed, the routine goes to step 24 whereat a new base station is advised together with a new set of neighboring base stations BSi (i=1, 2, . . . n)(n is five in the case shown in FIG. 1 for example). On the other hand, if the answer is negative at step 22, the routine proceeds to step 26. At this step 26, the power of each of the pilot signals on the forward link (viz., inbound link or base station to mobile unit link) in connection with the base stations $BS_0$ and BSi are measured. Following this, at step 28, each of the measured pilot signal's power values is compared with a predetermined value (T1) so as to select the values exceeding T1. The power values thus selected are denoted by $B_0$ and Bi (i=1, 2, . . . , m (m≦n)) wherein $B_0$ is the power value of $BS_0$ and Bi are power values of BSi. Thereafter, at step 30, the power values $B_0$ and Bi are transmitted to the current base station $BS_0$.

Figure 4A:
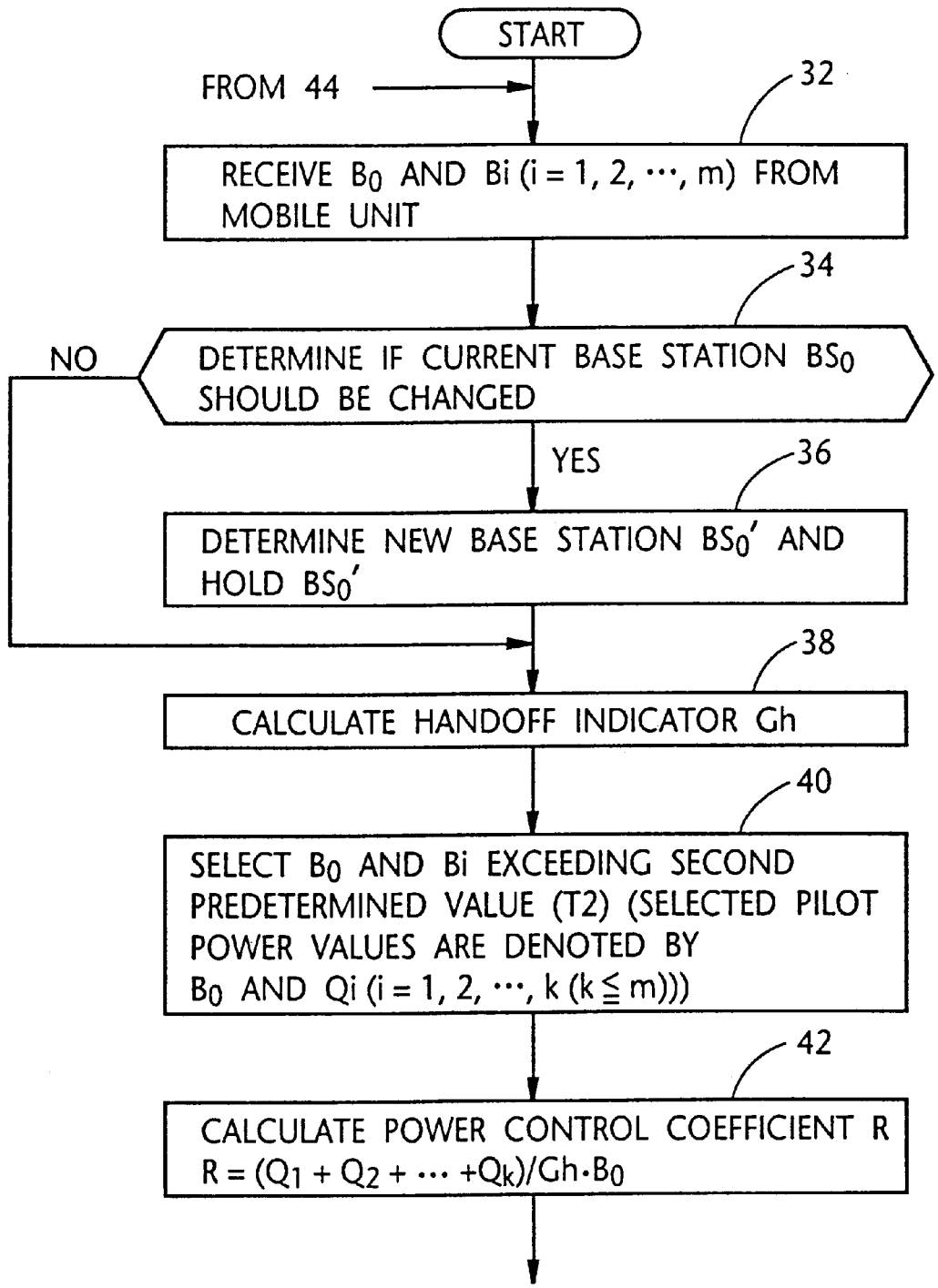
Figure 4B:
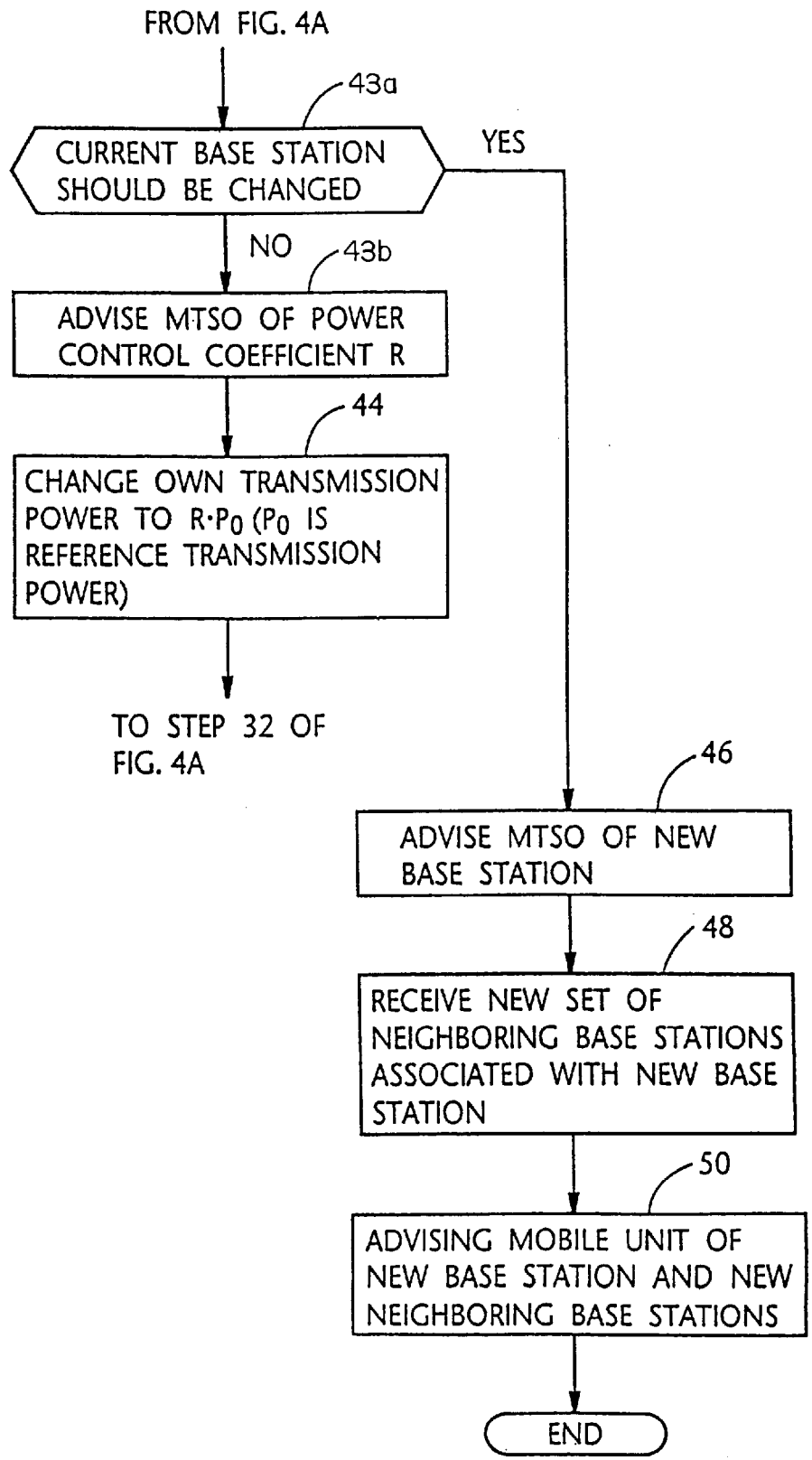

FIGS. 4A and 4B show the steps which are implemented at the current base station. At step 32, the base station receives the power values $B_0$ and Bi from the mobile unit. Thereafter, at steps 34 and 36, a check is made to determine if the current base station should be changed based on the power values $B_0$ and Bi received at step 32. If a change of the base station is to be implemented, the data indicating the new base station (denoted by $BS'_0$) is stored in the current base station. If a change of the current base station is not required, the routine directly goes to step 38 at which a handoff indicator Gh is calculated as follows. In this case, Bi are rewritten by Qi $$Gh=(Q_1+Q_2+\ldots+Q_m)/B_0 \qquad (1)$$

Following this, at step 40, the power values $B_0$ and Qi, exceeding a second predetermined value (T2), are selected. The selected power values are denoted by $B_0$ and Qi (i=1, 2, . . . , k (k≦m). It is to be noted that the value $B_0$ is selected in that this value is the largest one. Following this, a power control coefficient R is calculated as follows at step 42.

$$R=(Q_1+Q_2+\ldots+Q_K)Gh \cdot B_0 \qquad (2)$$

Therefore, R can be rewritten using equation (1) as follows.

$$R=(Q_1+Q_2+\ldots+Q_K)/(Q_1+Q_2+\ldots+Q_m) \qquad (3)$$

Thereafter, the routine goes to the steps of FIG. 4B wherein if the current base station should not be changed (determined at step 43a) the routine goes through steps 43b and 44 to step 32 (FIG. 4A). On the other hand, if the current station should be changed, the routine goes through steps 46, 48 and 50 and is terminated. More specifically, as shown in FIG. 4B, at step 43b, the base station advises the MTSO of the power control coefficient R, and at step 44, the base station changes the transmission power thereof to $R \cdot P_0$ ($P_0$ is a reference transmission power). On the other hand, if an answer is positive at step 43a, the routine goes to step 46 at which the base station advises the MTSO of the new station. Thereafter, at step 48, the base station receives a new set of neighboring base stations associated with the new base station. Subsequently, at step 50, the base station advises the mobile unit of the new base station and the new neighboring base stations.

A second embodiment of the present invention will be described with reference to FIGS. 5A and 5B.

As shown in FIG. 5A, steps 32' to 40' are identical to step 32 to 40 and hence further descriptions thereof are omitted for brevity. The second embodiment features that the power control coefficient R is derived using total transmission power values (Pi) of the base stations and the corresponding power values Qi. In FIG. 5A, Pmax indicates the maximum allowable power value of each base station. More specifically, at step 52, the base station receives, from the MTSO, a total transmission power value of each of the base stations associated with Qi (the total transmission power values are denoted by Pi). Thereafter, the routine goes to step 54 where the power control coefficient R is calculated as follows: $R=((P_1 \cdot Q_1 + P_2 \cdot Q_2 + \ldots + P_k Q_k)/Gh \cdot Pmax \cdot B_0)$ On the other hand, the power control coefficient R should be in a range between previously determined minimum and maximum values (Rmin and Rmax). The manner of defining the coefficient R between Rmin and Rmax is shown in FIG. 5B. As shown in FIG. 5B, at step 56, a check is made to determine if R>Rmax. If the answer at step 56 is affirmative, the routine goes to step 58 where R is replaced with Rmax, after which the routine proceeds to the flow chart of FIG. 4B. On the contrary, if the answer at step 56 is negative, the routine goes to step 60 where a further check is made to determine if R<Rmin. If the answer at step 60 is affirmative, the routine goes to step 62 where R is replaced with Rmin, after which the routine proceeds to the flow chart of FIG. 4B. On the contrary, if the answer at step 60 is negative, the routine directly goes to the flow chart of FIG. 4B. After implementing either step 62 or step 58, the routine goes to the program which is exactly identical to that shown in FIG. 4B.

A third embodiment of the present invention will be described with reference to FIGS. 6.

As shown in FIG. 6, steps 32' to 38' are identical to step 32 to 38 and hence further descriptions thereof are omitted for brevity. The third embodiment features that the number of pilot signals (m in this case) is checked for whether or not the number exceeds the previously determined maximum number of pilot signals (Nmax). If m>Nmax at Step 70, steps 72 and 74 are implemented and the routine proceeds to step 76. Otherwise, the routine implements steps 78 and 80 and then goes to step 76. After carrying out step 76, the routine goes to the program which is exactly identical to that shown in FIG. 4B.

A fourth embodiment of the present invention will be described with reference to FIGS. 7A, 7B and 8. This embodiment is to carry out, at the mobile unit, steps which are executed in the current base station in the first embodiment Therefore, the burden on the base station can be reduced.

As shown in FIG. 7A, steps 22' to 26' are identical to step 22 to 26 of FIG. 3, while as shown in FIG. 7B, steps 34' to 42' are identical to steps 34 to 42 shown in FIG. 4A. At step 90 (FIG. 7B), if the current base station should be changed, data indicating the new base station (depicted by $BS_0'$ is informed to the current base station together with the power control coefficient R. Otherwise, only the coefficient R is transmitted to the current base station $BS_0$. After step 90, the routine returns to step 22' of FIG. 7A in order to repeat the operations. On the other hand, as shown in FIG. 8, at step 92, the current base station receives the information (viz., $BS_0'$ (if any) and R) which the mobile unit transmitted at step 90. Following this, steps 40' to 50' are implemented which are respectively identical to steps 40 to 50 of FIG. 4B.

A fifth embodiment of the present invention will be described with reference to FIGS. 9A and 9B The instant embodiment features a calculated power control coefficient (denoted by R' in step 42') which is checked to determine if R' is within a predetermined range where the current base station should not be changed. For this purpose, the power control coefficient R is initialized at step 100 (viz., R is set to one (1)). The following steps 22' to 40' are exactly identical to steps 22 to 40 shown in FIGS. 7A and 7B step 42' of FIG. 9B is similar to the counterpart of FIG. 7B. At step 102, a check is made to determine if the current base station should be changed. If the answer is negative at this step, the routine goes to step 104 at which the calculated power control coefficient R' is checked if R' is within the predetermined range as mentioned above. If the answer at step 104 is NO, the calculated coefficient R' is adopted and then advised to the base station $BS_0$ at steps 106 and 108. On the other hand, if the answer at step 104 is YES, the routine proceeds to step 22' of FIG. 9A.

It will be understood that the above disclosure is representative of five possible embodiments of the present invention and that the concept on which the invention is based is not specifically limited thereto.

What is claimed is:

1. A method of controlling transmission power of at least one base station among a plurality of base stations associated with a mobile unit in a CDMA (code division multiple access) cellular system, said mobile unit communicating with said at least one base station, said method comprising the steps of:

(a) measuring, at said mobile unit, a power value of each of a plurality of pilot signals respectively transmitted from said plurality of base stations;

(b) determining a first power control coefficient which is a ratio of total pilot power values of said plurality of base stations, other than said at least one base station, to a pilot power value of said at least one base station; and (c) controlling the transmission power of at least one base station by using said first power control coefficient.

2. A method as claimed in claim 1, wherein the power of each of the pilot signals is compared, at said mobile unit, with a predetermined value after step (a), a power exceeding the predetermined value being selected, and the values of selected power being sent to said at least one base station and being used to determine said first power control coefficient in step (b) said first power control coefficient being used to control the transmission power in step (c).

3. A method as claimed in claim 1, further comprising the steps of:

receiving, at said at least one base station, total transmission power of each of said plurality of base stations from a MTSO (mobile telephone switching office) which is provided in said CDMA cellular system to supervise overall operations of the system;

determining, at said at least one base station, a second power control coefficient which is a ratio of $(P_1Q_1+P_2Q_2+\ldots+P_kQ_k)$ to $(Gh \cdot Pm \cdot B_0)$ where $P_i(i=1, 2, \ldots k)$ is the total transmission power of an i-th base station, $Q_i(i=1, 2, \ldots k)$ is the power value of the pilot signal of an i-th base station other than said at least one base station, Pm is a maximum transmission power of each of the base stations, and $B_0$ is the power value of pilot signal of said at least one base station; and controlling the transmission power of said at least one base station using said second power control coefficient instead of said first power control coefficient.

4. A method as claimed in claim 1, wherein the power of each of the pilot signals is compared, at said mobile unit, with a first predetermined value after step (a), a power exceeding the first predetermined value being selected, and the values of selected power being sent to said at least one base station.

5. A method as claimed in claim 4, wherein each of the values of selected power is compared, at said at least one base station, with a second predetermined value in step (c), and the power values each exceeding said second predetermined value being used to determine said power control coefficient.

6. A method as claimed in claim 5, further comprising the steps of:

receiving, at said at least one base station, total transmission power of each of said plurality of base stations from MTSO (mobile telephone switching office) which is provided in said CDMA cellular system to supervise overall operations of the system;

determining, at said at least one base station, a second power control coefficient which is a ratio of $(P_1Q_1+P_2Q_2+\ldots+P_kQ_k)$ to $(Gh \cdot Pm \cdot B_0)$ where $P_i(i=1, 2, \ldots k)$ is total transmission power of an i-th base station, $Q_i$ ($i=1, 2, \ldots k$) is the power value of the pilot signal of i-th base station other than said at least one base station, Pm is a maximum transmission power of each of the base stations, and $B_0$ is the power value of pilot signal of said at least one base station; and controlling the transmission power of said at least one base station using said second power control coefficient instead of said first power control coefficient.

7. A method of controlling transmission power of at least one base station of a plurality of base stations associated with a mobile unit in a CDMA cellular system, said mobile unit communicating with said at least one base station, said method comprising the steps of:

(a) measuring, at said mobile unit, a first power value of a pilot signal transmitted from said at least one base station and a plurality of second power values each transmitted from said plurality of base stations other than said at least one base station;

(b) advising said at least one base station of said first and second power values;

(c) determining, at said at least one base station, a power control coefficient using said first and second power values; and (d) controlling the transmission power of said at least one base station using said power control coefficient.

8. A method as claimed in claim 7, wherein said power control coefficient is a ratio of said first and second power values.

9. A method as claimed in claim 7, wherein each of said first and second values is compared, at said mobile unit, with a first predetermined value after step (a), the power value exceeding said first predetermined value being selected and being sent to said at least one base station.

10. A method as claimed in claim 7, wherein each of said first and second values is compared, at said at least one base station, with a second predetermined value in step (c), and the power values exceeding said second predetermined value being used to determine said power control coefficient.

11. A method as claimed in claim 7, further comprising the steps of:

receiving, at said at least one base station, total transmission power of each of said plurality of base stations from MTSO which is provided in said CDMA cellular system to supervise overall operations of the system;

determining, at said at least one base station, another power control coefficient which is a ratio of $(P_1Q_1+P_2Q_2+\ldots+P_kQ_k)$ to $(Gh \cdot Pm \cdot B_0)$ where $P_i(i=1, 2, \ldots k)$ is total transmission power of an i-th base station, $Q_i$ ($i=1, 2, \ldots k$) is the power value of the pilot signal of i-th base station other than said at least one base station, Pm is a maximum transmission power of each of the base stations, and $B_0$ is the power value of pilot signal of said at least one base station; and controlling the transmission power of said at least one base station using said another power control coefficient instead of the first-mentioned power control coefficient.

12. A method of controlling transmission power of at least one base station among a plurality of base stations associated with a mobile unit in a CDMA cellular system, said mobile unit communicating with said at least one base station, said method comprising the steps of:

(a) measuring, at said mobile unit, a first power value of a pilot signal transmitted from said at least one base station and a plurality of second power values each transmitted from said plurality of base stations other than said at least one base station;

(b) determining, at said mobile unit, a power control coefficient using said first and second power values;

(c) advising said at least one base station of said power control coefficient; and (d) controlling the transmission power of said at least one base station using said power control coefficient.

13. A method as claimed in claim 12, wherein said power control coefficient is a ratio of said first and second power values.

14. A method as claimed in claim 12, wherein each of said first and second values is compared, at said mobile unit, with a predetermined value after step (a), a power exceeding said predetermined value being selected, and the values of selected power being used to determine said power control coefficient in step (b).

* * * * *

UNITED STATES PATENT AND TRADEMARK OFFICE
CERTIFICATE OF CORRECTION

PATENT NO.: 6,026,081
DATED: February 15, 2000
INVENTOR: Kojiro HAMABE

It is certified that error appears in the above-identified patent and that said Letters Patent is hereby corrected as shown below:

In the title, after "CELLULAR" insert --CDMA SYSTEM--

Column 2, line 15, delete "ass" and insert --associated--.

Signed and Sealed this

Twenty-fourth Day of April, 2001

Attest:

NICHOLAS P. GODICI

Attesting Officer                Acting Director of the United States Patent and Trademark Office